P. H. Kells.

Brick-Machine.

No. 2810 Reissued Dec. 10, 1867.

Witnesses:
Chas. D. Smith
J. E. McBowen.

Inventor:
Philip H. Kells
Per Knight Bros. Attys.

P. H. Kells.

Brick-Machine.

No. 2810 Reissued Dec. 10, 1867.

Witnesses:
J. E. M. Bowen
Chas. D. Smith

Inventor:
Philip H. Kells
Per Knight Bros Attys.

P. H. Kells.

Brick-Machine.

No. 2810 Reissued Dec. 10, 1867.

Inventor:

Philip H. Kells
Per Knight Bros Attys

Witnesses:

Chas. D. Smith

J. S. McOwen

BEST AVAILABLE COPY

United States Patent Office.

PHILIP H. KELLS, OF ADRIAN, MICHIGAN.

*Letters Patent No.* 63,057, *dated March* 19, 1867;—*reissue No.* 2,810, *dated December* 10, 1867.

IMPROVED BRICK-MACHINE.

The Schedule referred to in these Letters Patent and making part of the same.

TO ALL WHOM IT MAY CONCERN:

Be it known that I, PHILIP H. KELLS, of Adrian, in the county of Lenawee, and State of Michigan, have invented a new and improved Brick-Machine; and I do hereby declare the following to be a full, clear, and exact description of the same, sufficient to enable one skilled in the art to which the invention appertains to make use of it, reference being had to the accompanying drawings, forming a part of the specification, and in which—

Similar letters of reference indicate corresponding parts in the several figures.

Figure 1:
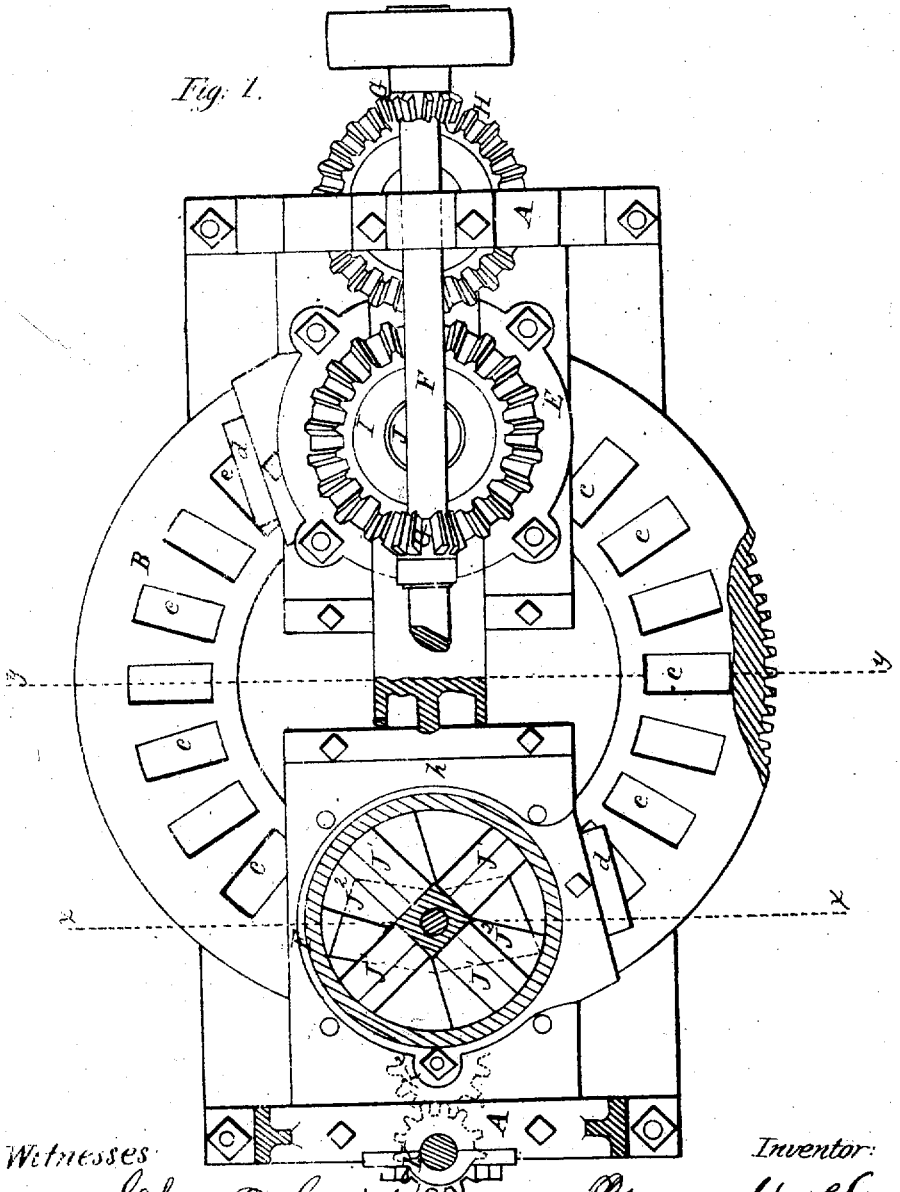
Figure 1 is a top view, partly in section.
Figure 2:
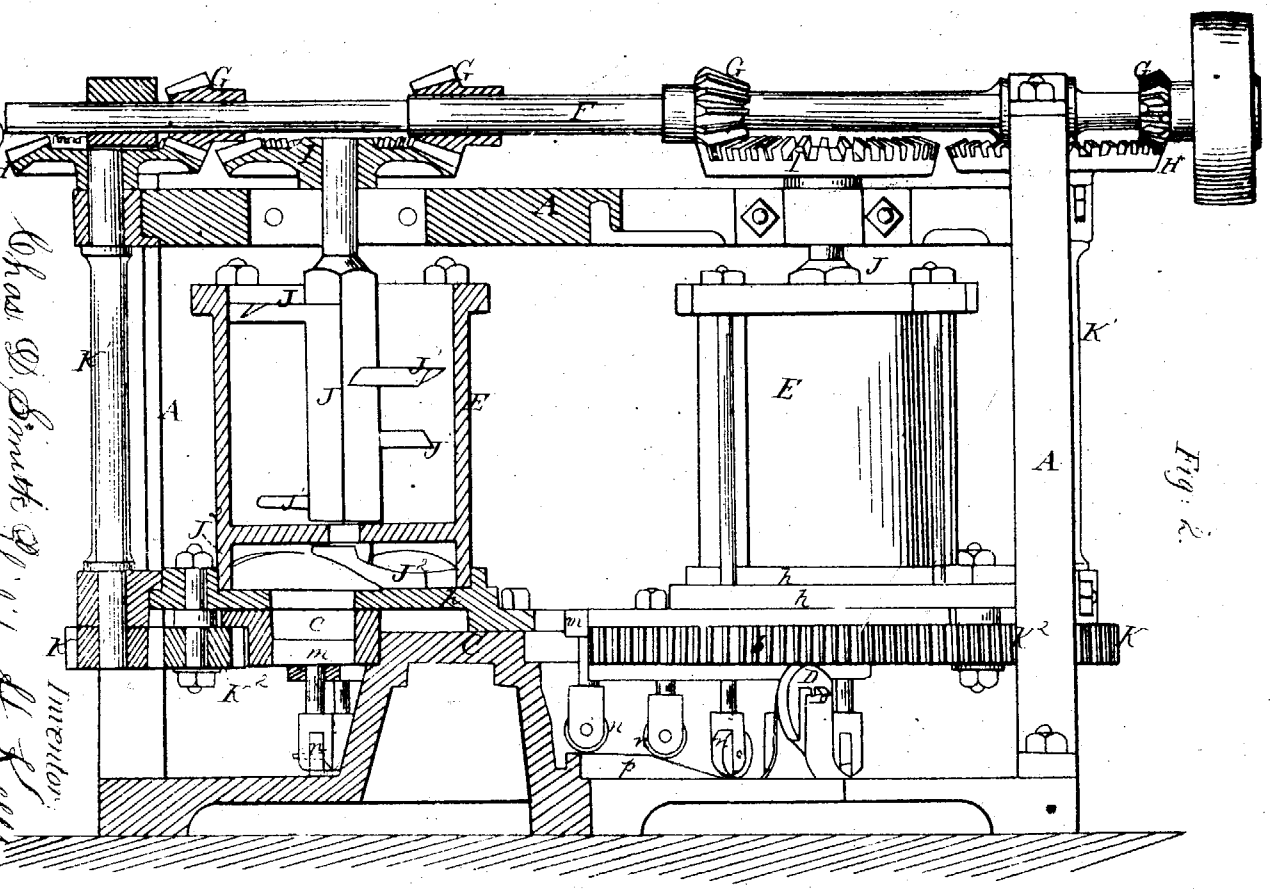
Figure 2 is a sectional elevation.
Figure 3:
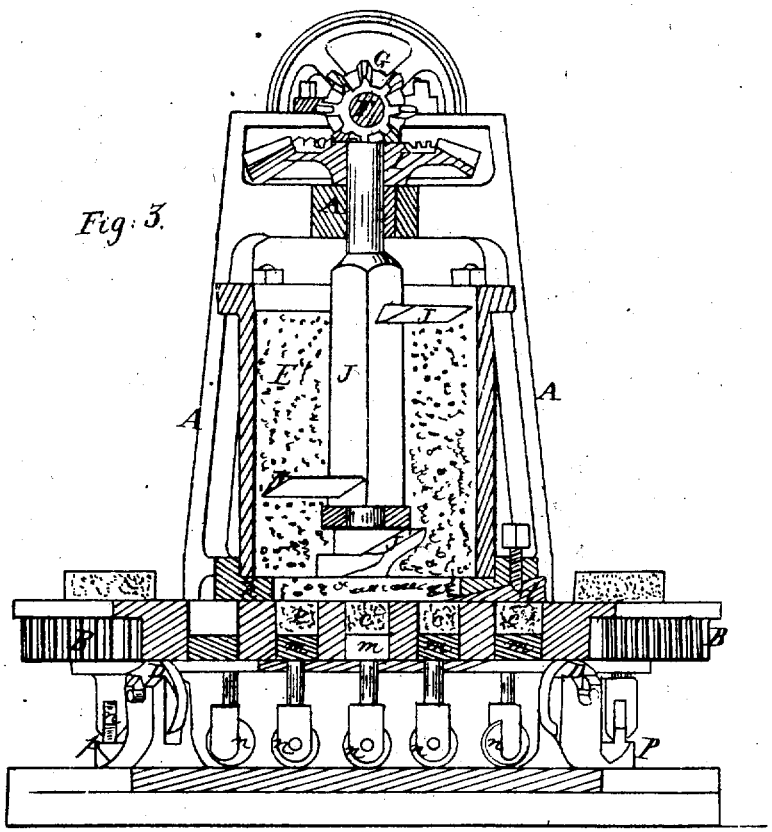
Figure 3 is a vertical section through one of the pug-mills, the line *x x*, fig. 1, indicating the plane of section.
Figure 4:
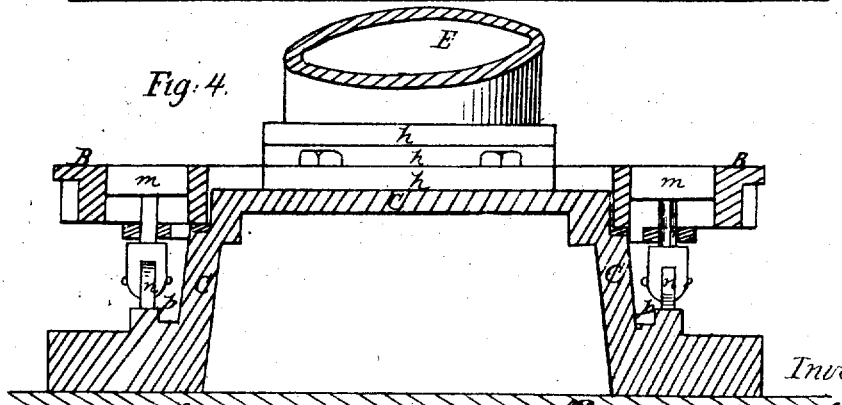
Figure 4 is a vertical section on the line *y y*, fig. 1.

The clay is ground in two pug-mills, and pressed into moulds on opposite portions of the upper side of a bed or wheel rotating on a vertical axis, which is afforded by a central hub upon which the mould-wheel rests. The mould-wheel is also supported by carrier-wheels. The clay is pressed into the moulds by the blades of the pug-mill shafts, and the superfluity is removed, leaving the upper surface of the brick smooth, by the passage of the mould under a wedge shaped cut-off. The bricks are raised and discharged from the moulds by followers moved from below by the passage of their carrier-wheels up an inclined plane on the bed-track.

In the drawings, A A is a frame, having an annular mould-bed, B, which is supported by a central hub, C, and carrier-wheels D, as it rotates beneath the pug-mills E E, which occupy positions at opposite portions of the upper side of the mould-bed. The motions of the various parts are derived from the main shaft F, whose bevel-pinions G rotate the wheels H H I I. The wheels H H rotate the shafts $K^1$ $K^1$, which carry at their lower ends the rotating pinions K K, which engage or gear with the cogged periphery of the mould-wheel B, through the medium of the intermediate pinions $K^2$ $K^2$, said mould-wheel thus receiving a steady rotary motion by power applied at its opposite sides. The bevel-cogs I I impart a rotary motion to the vertical central shafts J J of the pug-mills. The pug-mills are supplied with clay, which is tempered therein by the radial arms $J^1$ $J^1$, and forced therefrom by the oblique blades $J^2$ $J^2$, which project from the shafts J J. The oblique blades $J^2$ press the clay through the throat *b* into the moulds *c*, in which it is solidly packed. As the mould-bed rotates, the moulds are brought under the wedge-shaped piece *d*, the sharp edge of which shaves off all the clay not in the moulds, and smooths the moulded clay on its upper surface. The pug-mills are supported upon bridge-pieces or bed-plates *h h*; which rest upon the central hub C and the frame A. The brick, having passed from beneath the pug-mill, is ejected from the mould by the raising of the follower *m*, which forms the bottom of the mould. This is accomplished by causing the carrier *n*, which supports the follower, to rise on the incline *p*, and thrust the follower up even with the surface of the mould-bed, when the brick is removed by the attendant. If desired, the gearing may be so arranged as to rotate the mould-wheel and the pug-mill shafts in the same direction.

Having described my invention, what I claim therein as new, and desire to secure by Letters Patent, is—

1. The combination of the annular mould-bed B, and the central hub or support C, substantially as described and represented.

2. The adjustable wedge-shaped cut-off *d*, arranged and employed in the manner and for the purpose explained.

3. The arrangement upon the mould-wheel of the two pug-mills on opposite portions, substantially as described.

4. An annular mould-wheel, provided with cogs or gear-teeth upon its periphery, and mounted upon a central hub or support, substantially as and for the purpose set forth.

To the above specification of my improved brick-machine, I have signed my hand, this day of

PHILIP H. KELLS.

Witnesses:

N. B. FASSETT,

H. M. CHILDS.